United States Patent
Long et al.

(10) Patent No.: US 7,338,407 B2
(45) Date of Patent: Mar. 4, 2008

(54) REDUCED ENGINE LOAD AT STOP APPARATUS AND METHOD

(75) Inventors: Charles F. Long, Pittsboro, IN (US);
Jeffrey J. Cole, Plainfield, IN (US);
Phillip F. Mc Cauley, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 212 days.

(21) Appl. No.: 11/333,079

(22) Filed: Jan. 17, 2006

(65) Prior Publication Data
US 2007/0167285 A1    Jul. 19, 2007

(51) Int. Cl.
*F16H 61/48* (2006.01)
(52) U.S. Cl. .......................................... 477/60; 477/61
(58) Field of Classification Search .................. 477/60, 477/61, 52, 53, 62, 68, 70, 71, 92–95
See application file for complete search history.

(56) References Cited

U.S. PATENT DOCUMENTS

| | | | | |
|---|---|---|---|---|
| 3,588,353 A | * | 6/1971 | Iijima | 704/268 |
| 3,724,292 A | * | 4/1973 | Borman | 477/150 |
| 3,814,221 A | * | 6/1974 | Fuehrer | 192/3.34 |
| 4,917,140 A | | 4/1990 | King et al. | 137/116.3 |
| 5,669,473 A | | 9/1997 | Long et al. | 192/3.3 |
| 5,911,244 A | | 6/1999 | Long et al. | 137/625.64 |
| 6,117,047 A | * | 9/2000 | Younger | 477/130 |
| 6,155,949 A | | 12/2000 | Long et al. | 475/127 |

\* cited by examiner

*Primary Examiner*—Tisha Lewis

(57) ABSTRACT

Provided is an apparatus to enable a torque transmitting mechanism within an automatically shiftable power transmission to disengage at vehicle stop such that the slip within a fluid drive device is reduced. When vehicle movement is required a main pressure regulator trims the torque transmitting mechanism into engagement. A method of reducing engine load at vehicle stop by employing the apparatus of the present invention is also provided.

13 Claims, 3 Drawing Sheets

REDUCED ENGINE LOAD AT STOP APPARATUS AND METHOD

TECHNICAL FIELD

This invention relates to control systems for an automatically shiftable vehicular transmission, and more specifically, to an apparatus and method of reducing engine load at vehicle stop.

BACKGROUND OF THE INVENTION

Automatically shiftable transmissions used in transportation vehicles, such as cars, buses, and trucks, require a positive displacement pump to supply pressurized hydraulic fluid for torque transmitting mechanism (clutches and brakes) engagement, torque converter operation, and cooling flow.

The pump requires power from the engine or prime mover to supply the required control pressure. The power absorbed by the pump and therefore supplied by the engine is a function of the pressure and displacement of the pump. The higher the pump output pressure or main pressure of the transmission, the more horsepower required from the engine.

Current transmissions utilize control mechanisms having electronic systems. The electronic systems are supplied with signals from the engine, vehicle, and transmission. The signals are utilized to determine the operating parameters of various solenoid valves within the control system to modulate various pressures including the main pressure or line pressure of the transmission. By modulating the main pressure, the efficiency of the vehicle may be improved.

Additionally, when the vehicle comes to a stop, while in gear, the torque converter slips to decouple the engine from the remainder of the drivetrain. This slipping within the torque converter may decrease operating efficiency of the vehicle as well as cause the hydraulic fluid contained within the torque converter to heat.

SUMMARY OF THE INVENTION

Provided is a reduced engine load at stop apparatus for a vehicular transmission. The reduced engine load at stop apparatus includes a selectively engageable torque transmitting mechanism corresponding to a low forward range and having a piston member operable to effect engagement of the selectively engageable torque transmitting mechanism in response to a fluid pressure. A return spring assembly operates to disengage the selectively engageable torque transmitting mechanism when the fluid pressure provided to the selectively engageable torque transmitting mechanism falls below a predetermined value. Also provided is a main pressure regulator valve in selective fluid communication with the selectively engageable torque transmitting mechanism. The main pressure regulator valve operates to reduce the fluid pressure below the predetermined value to effect disengagement of the selectively engageable torque transmitting mechanism in response to a first operator input. The first operator input may include depressing a brake pedal. The main pressure regulator valve is operable to increase the fluid pressure communicated to the selectively engageable torque transmitting mechanism above the predetermined value to engage the selectively engageable torque transmitting mechanism in response to a second operator input. The second operator input may include releasing the brake pedal.

The main pressure regulator valve may include a valve spool slidably disposed within a stepped bore defined by a valve body. A first pressure responsive surface area is defined by the valve spool and is subject to pressurized fluid from a main pressure source. A second pressure responsive surface area is defined by the valve spool and is subject to pressurized fluid from a main modulation control source. A third pressure responsive surface area is defined by the valve spool and is selectively subject to pressurized fluid from one of the main pressure source and the main modulation control source. Additionally the main pressure regulator valve includes a sleeve slidably disposed within the stepped bore. The sleeve operates to selectively distribute pressurized fluid from one of the main pressure source and the main modulation control source to the third pressure responsive surface area to effect a change in pressure gain of the main pressure regulator valve.

Also provided is a method of controlling a vehicle having a transmission and a brake pedal having a brake position sensor operable to determine whether the brake pedal is in a depressed state or a released state. The method includes providing the transmission with a selectively engageable torque transmitting device within the transmission and a main pressure regulator valve operable to selectively provide pressurized fluid to selectively engage the selectively engageable torque transmitting mechanism. Subsequently, it is determined if the brake pedal is in the depressed state. If the brake pedal is depressed, the main pressure regulator valve is controlled to decrease fluid pressure to the selectively engageable torque transmitting mechanism to effect one of disengagement and slip while the brake pedal is in the depressed state. Next, it is determined if the brake pedal is in the released state. If so, the main pressure regulator valve is controlled to increase fluid pressure to the selectively engageable torque transmitting mechanism to effect engagement of the selectively engageable torque transmitting mechanism.

Additionally the method outlined above may include feedback on the state of a fluid drive device disposed between the engine and the transmission. The method may further include determining if the fluid drive device is slipping less than or equal to a predetermined amount and controlling the main pressure regulator valve to vary fluid pressure to the selectively engageable torque transmitting mechanism. Thereby the engagement of the selectively engageable torque transmitting mechanism is varied until the fluid drive device is slipping less than or equal to the predetermined amount.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
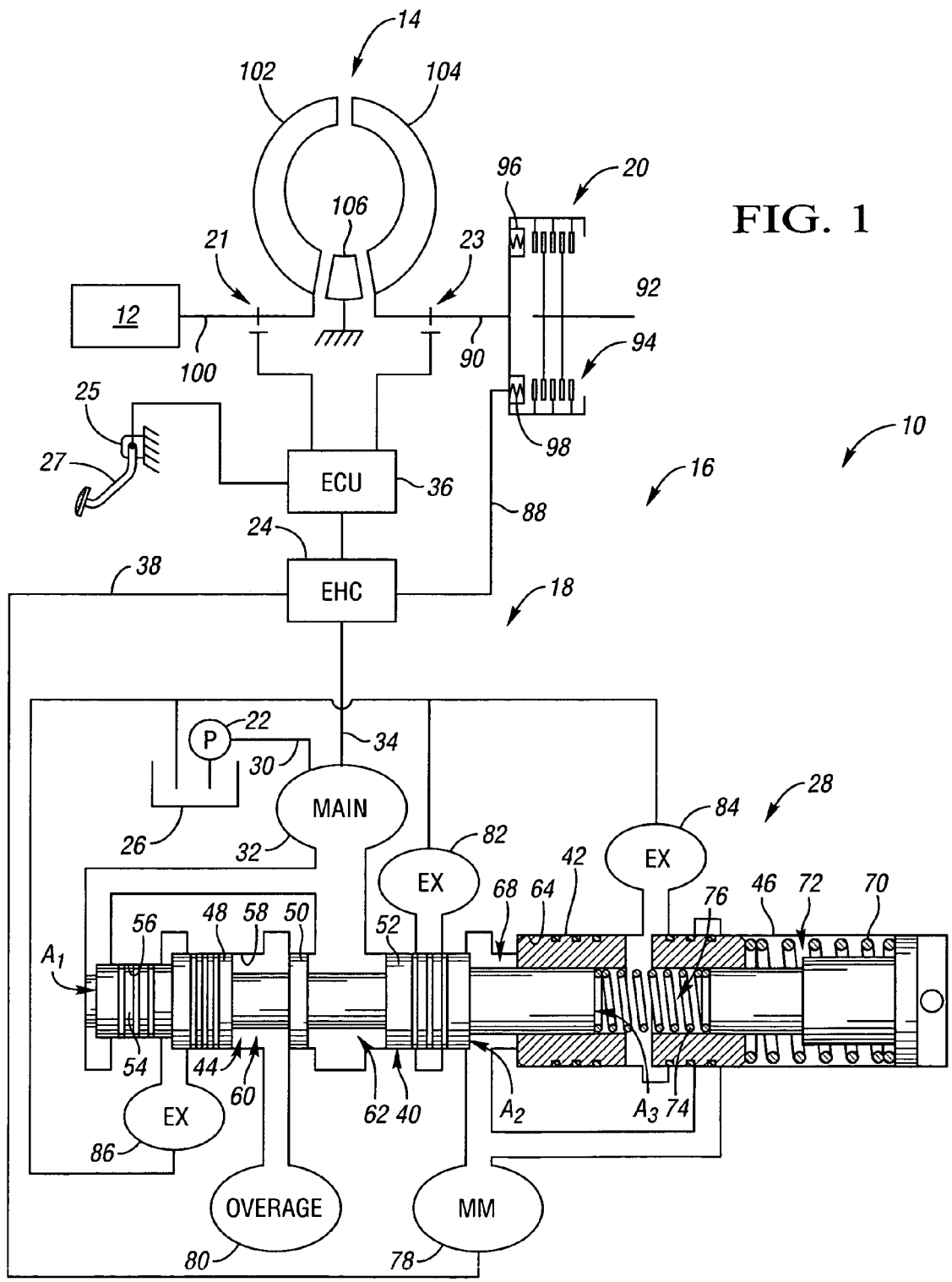
FIG. 1 is a schematic representation of a partial powertrain for a vehicle illustrating a reduced engine load at stop apparatus consistent with the present invention.

Referring to the drawings wherein like characters represent the same or corresponding parts, there is seen in FIG. 1 a portion of a vehicular powertrain 10 including a engine 12, a fluid drive device 14, and a portion of an automatically shiftable transmission 16. The transmission 16 includes a transmission control system 18 and a selectively engageable torque transmitting mechanism 20. The torque transmitting mechanism 20, as shown in FIG. 1, is a clutch corresponding to a first forward range of gear engagement. The transmission control system 18 includes a pump 22 and an electro-hydraulic control, or EHC, 24. The pump 22 is a positive displacement mechanism that draws hydraulic fluid from a reservoir 26 and delivers the fluid to a main regulator valve 28 though a passage 30. The main regulator valve 28 operates to vary the pressure of the fluid delivered by the pump 22. The fluid is subsequently communicated from a main pressure source 32 to the EHC 24 through a line pressure or main pressure passage 34.

The EHC 24 communicates with an electronic control unit (ECU) 36 having a pre-programmable digital computer. The EHC 24 includes control valves that distribute hydraulic fluid to the many devices in an automatic transmission including the torque transmitting mechanisms. The ECU 36 emits electrical control signals to various electronic elements such as solenoid valves, which in turn control the output pressure of the hydraulic valves. Additionally the ECU 36 may input various measured parameters during vehicle operation such as engine and transmission rotational speed from speed sensors 21 and 23, respectively, as well as the position of a brake pedal 27 from brake pedal sensor 25. The ECU 36 can be programmed based on either or both experimental and modeling results, to perform the function set forth in detail below. The EHC 24 produces a variable hydraulic control signal that is distributed through a control passage 38 to provide a control signal to modulate the main regulator valve 28. The hydraulic control signal may be produced by a solenoid valve, such as a variable bleed solenoid valve, disposed within the EHC 24.

The main regulator valve 28 has a valve spool 40 and a sleeve 42 slidably disposed in concentric longitudinal arrangement within a stepped valve bore 44 that is defined by a valve body 46. The valve spool 40 has spaced equal diameter lands 48, 50, and 52, and a smaller end land 54. The end land 54 is positioned in a bore portion 56 of the valve bore 44, and the lands 48, 50, and 52 are positioned in a bore portion 58 of the valve bore 44. The lands 48 and 50 are spaced such that a generally annular valley 60 is formed. Similarly, the lands 50 and 52 are spaced such that a generally annular valley 62 is formed. The sleeve 42 is positioned in a bore portion 64 of the valve bore 44. The sleeve 42 is piloted on a land 66 and is spaced from the land 52 to form a generally annular valley 68. The bore portion 58 is larger in diameter than the bore portion 56, while the bore portion 64 is larger in diameter than the bore portion 58. A spring 70 is disposed within a spring pocket 72 and operates to bias the sleeve 42. A spring 74 is disposed within a spring pocket 76. The spring 74 imposes a bias force on the valve spool 40 to urge the valve spool 40 leftward as viewed in FIG. 1. It should be noted that in the present embodiment, the spring pockets 72 and 76 are not in fluid communication.

The valve body 46 communicates with the main pressure source 32 that is in fluid communication with the passage 30 and the main pressure passage 34. The valve body 46 is in selective fluid communication with a main modulation control source 78 connected with the control passage 38, an overage port 80, and exhaust ports 82, 84, and 86. The exhaust ports 82, 84, and 86 communicate with the reservoir 26. The main pressure source 32 is in fluid communication with the valley 62. The main modulation control source 78 is in selective fluid communication with the valley 68 and the valve pocket 76. The overage port 80 is selectively opened to the main pressure source 32 by the land 50. The exhaust port 82 is selectively opened and closed by the land 52. The exhaust port 84 and the main modulation control source 78 are selectively, and alternately, opened to the spring pocket 76 by the sleeve 42.

The land 54 forms a pressure responsive surface area $A_1$. While the lands 52 and 66 form a pressure responsive differential surface area $A_2$. The land 66 forms a pressure responsive surface area $A_3$. In operation, the main regulator valve 28 regulates or controls the fluid pressure within the main pressure passage 34, which is subsequently introduced to the EHC 24. FIG. 1 illustrates the main regulator valve 28 with the valve spool 40 in the low gain or un-boosted condition. With the valve spool 40 in the spring set position, as shown in FIG. 1, the fluid pressure within the main passage 34 is substantially unregulated and is generally the same pressure as the fluid within passage 30. As the fluid pressure within the main pressure source 32 increases, the force of the pressurized fluid acting on surface area Al of the land 54 increases, thereby moving the valve spool 40 rightward, as viewed in FIG. 1, against the bias of spring 74. As the valve spool 40 moves rightward, the land 50 will open the main pressure source 32 to the valley 60 allowing pressurized fluid to flow to the overage port 80. The overage port 80 communicates fluid to other portions of the vehicles transmission such as, for example, a lubrication circuit or a fluid cooler. By diverting an amount of pressurized fluid from the main pressure source 32 to the overage port 80, the fluid pressure within the main pressure passage 34 is regulated to the desired level. The main modulation control source 78 selectively and variably provides fluid pressure to valley 68. This fluid pressure acts on the differential surface area $A_2$ to counteract the movement of the valve spool 40 in response to the fluid pressure within the main pressure source 32. With the sleeve 42 in the spring set position, as shown in FIG. 1, the pressurized fluid within the main modulation control source 78 is blocked from entering the spring pocket 76 and subsequently acting on surface area $A_3$ of the land 66. Instead, the spring pocket 76 exhausts any pressurized fluid through the exhaust port 84.

By properly selecting the ratio of $A_1$ to $A_2$ in the design stage of the main regulator valve 28, the gain rate for the un-boosted condition of the main regulator valve 28 may be controlled. This is stated in equation form as Pmain*$A_1$=Pmm*$A_2$+F, where Pmain is the fluid pressure within the main pressure source 32, Pmm is the fluid pressure within the main modulation control source 78, and F is the spring force exerted by the spring 76.

As the fluid pressure requirement of the EHC 24 increases, such as when trimming torque transmitting mechanisms into engagement, the main pressure regulator 28 will operate in a high gain or boosted condition. The fluid pressure within the main pressure source 32 will increase in response to the higher fluid pressure within the main modulation control source 78. As the pressure within the valley 68 increases, the fluid pressure biases the sleeve 42 against the bias force exerted by the spring 70. When the bias force is overcome, the sleeve 42 will move to a pressure set position within the bore 64. With the sleeve 42 in the pressure set position, the exhaust port 84 is blocked by the sleeve 42, such that the spring pocket 76 will no longer exhaust. Instead, the sleeve 42 will communicate pressurized fluid from the main modulation control source 78 to the spring pocket 76. With the sleeve 42 in the pressure set position, the pressurized fluid within the main modulation control source 78 acts on both the differential surface area $A_2$ and the surface area $A_3$.

By properly selecting the ratio of $A_1$ to $(A_2+A_3)$ in the design stage of the main regulator valve 28, the gain rate for the boosted operating mode of the main regulator valve 28 may be controlled. This is stated in equation form as Pmain*$A_1$=Pmm*$(A_2+A_3)$+F.

A feed passage 88 communicates pressurized fluid from the main pressure passage 34 to the torque transmitting mechanism 20 for engagement thereof. Those skilled in the art will understand that the torque transmitting mechanism 20 is utilized to maintain at least one of the ratios of the transmission 16. In this instance, the torque transmitting mechanism 20 selectively engages the first forward range of the transmission 16. The torque transmitting mechanism 20 must undergo controlled engagement during the interchange of ratios to accomplish a smooth and acceptable shift in the transmission. The torque transmitting mechanism 20 includes an input member 90 and an output member 92. A plurality of friction discs or plates 94 are disposed between the input member 90 and the output member 92. The plates 94 are alternately splined to the input member 90 and the output member 92 and are urged into engagement by a fluid operated piston 96 that is selectively pressurized by fluid within the feed passage 88. When the piston 96 is not pressurized, a return spring assembly 98 urges the piston 96 axially away from the plates 94. The return spring assembly 98 establishes a minimum hydraulic pressure that must be applied to the piston 96 prior to the piston 96 moving axially into engagement with the plates 94, and thereby engaging the torque transmitting mechanism 20.

Disposed between the input member 90 and an output member 100 of the engine 12 is a fluid drive device 14 such as a fluid coupling or a torque converter, as shown in FIG. 1. The fluid drive device 14 includes a pump housing 102 mounted for unitary rotation with the output member 100, and a turbine housing 104 mounted for unitary rotation with the input member 90. A stator 106 may be disposed between the pump housing 102 and the turbine housing 104. In operation, the output member 100 of the engine 12 rotates the pump housing 102 such that fluid contained within the pump housing 102 is directed into the turbine housing 104 through centrifugal force. This fluid transfer causes a transfer in torque, thereby urging the turbine housing to rotate. Torque multiplication may be achieved by including the stator 106 to redirect the fluid from the turbine housing 104 into the pump housing 102. The fluid drive device 14 is important in automatically shiftable transmissions as they allow the vehicle to come to a stop while in gear without stalling the engine 12. By allowing the pump housing 102 and the turbine housing 104 to slip relative to each other, the engine 12 and the transmission 16 may effectively be decoupled. In slipping the fluid drive device 14 at a vehicle stop, the fluid may be subject to heating and the efficiency of the powertrain 10 may be decreased.

Accordingly, the return spring assembly 98 of the present invention is selected such that the force required to urge the piston 96 out of engagement is greater than the minimum force provided by regulated pressurized fluid within the main pressure passage 34. By increasing the bias force of the return spring assembly 98 and reducing the fluid pressure within the main pressure passage 34, the torque transmitting mechanism 20 can disengage or slip when the vehicle comes to a rest. When movement of the vehicle is required, the main regulator valve 28 operates to trim the toque transmitting mechanism 20 into engagement, thereby eliminating the need for an additional trim regulator valve system. The efficiency of the powertrain 10 is thereby improved since the fluid drive device 14 is no longer slipping or slips very little.

Figure 2:
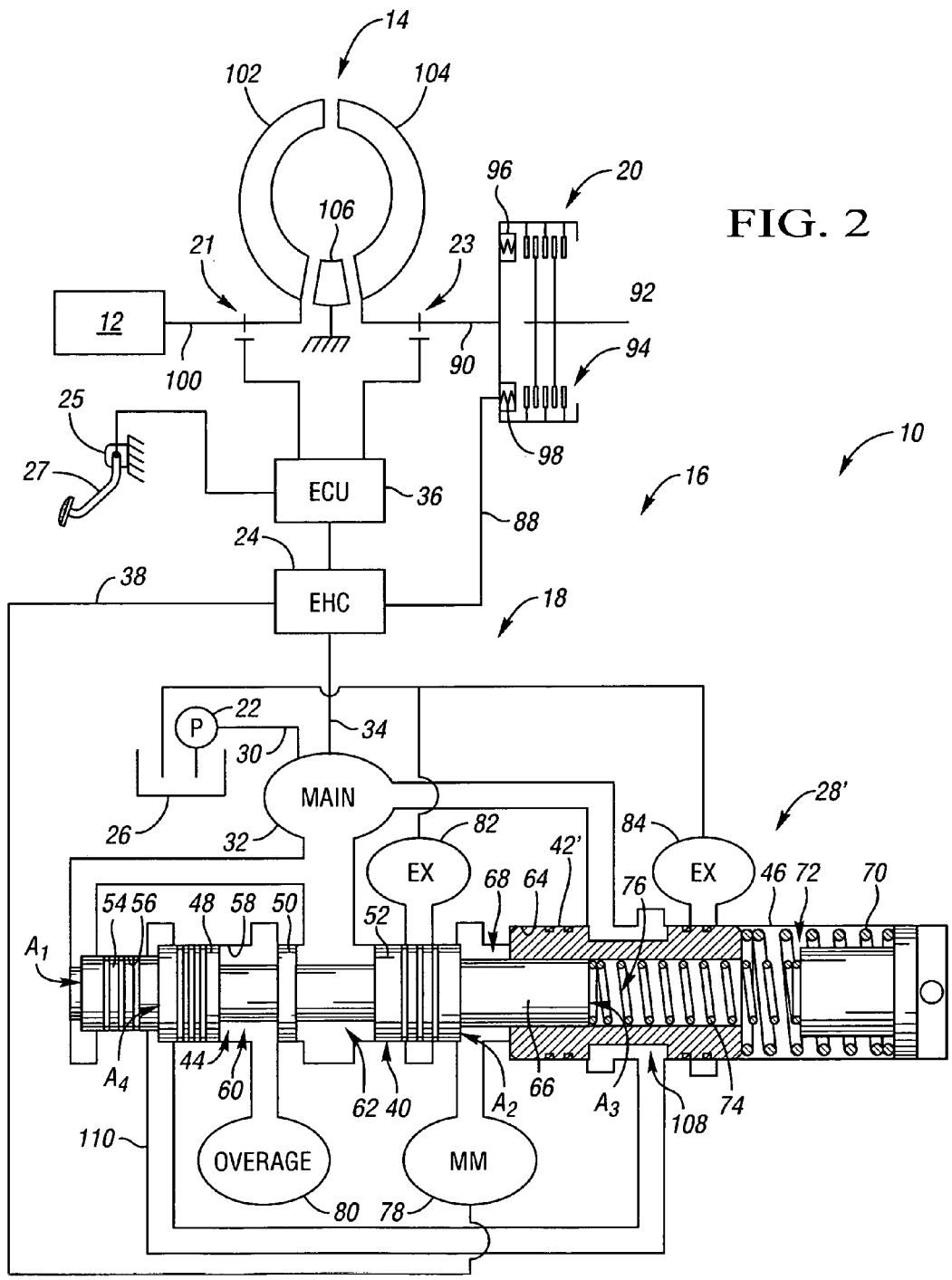
FIG. 2 is a schematic representation of a partial powertrain, similar to FIG. 1, illustrating an alternate embodiment for a main pressure regulator to be used within the reduced engine load at stop apparatus.

An alternate embodiment of the main regulator valve 28' is shown in FIG. 2. The main regulator valve 28' is similar in construction to the main regulator valve 28, shown in FIG. 1. A sleeve 42' is slidably disposed within the valve bore 44 that is defined by the valve body 46. The sleeve 42' defines an annular groove or valley 108 that is operable to selectively pressurize a passage 110 with pressurized fluid from the main pressure source 32. When the sleeve 42' in the spring set position, as shown in FIG. 2, pressurized fluid is communicated from the main pressure source 32 to the passage 110 via valley 108. The passage 110 communicates pressurized fluid to act on a pressure responsive differential surface area $A_4$ created by the valve lands 48 and 54. Alternately, with the sleeve 42' in the pressure set position, the passage 110 will exhaust to the exhaust port 84 via the valley 108. In this embodiment, the spring pockets 72 and 76 are in fluid communication.

In operation, the main regulator valve 28' regulates or controls the fluid pressure within the main passage 34, which is subsequently introduced to the EHC 24. FIG. 2 illustrates the main regulator valve 28' with the valve spool 40 in the low pressure gain or un-boosted condition. With the valve spool 40 in the spring set position, as shown in FIG. 2, the fluid pressure within the main passage 34 is substantially unregulated and is generally the same pressure as the fluid within passage 30. As the fluid pressure within the main pressure source 32 increases, the force acting on surface area $A_1$, of the land 54 will also increase, thereby moving the valve spool 40 rightward, as viewed in FIG. 2, against the bias of spring 74. Additionally, with the sleeve 42' in the spring set position, pressurized fluid within the main pressure source 32 is communicated to the passage 110 via valley 108. The pressurized fluid within the passage 110 acts on the differential surface area $A_4$, which further biases the valve spool 40 against the bias of spring 74. As the valve spool 40 moves rightward, the land 50 will open the main pressure source 32 to the valley 60 allowing pressurized fluid to flow to the overage port 80. The overage port 80 communicates fluid to other portions of the vehicle transmission such as, for example, a lubrication circuit or a fluid cooler. By diverting an amount of pressurized fluid from the main pressure source 32 to the overage port 80, the fluid pressure within the main pressure passage 34 is regulated to the desired level. The main modulation control source 78 selectively and variably provides fluid pressure to valley 68. This pressure acts on the differential surface area $A_2$ to counteract the movement of the valve spool 40 in response to the fluid pressure within the main pressure source 32 acting on the surface areas $A_1$ and $A_4$, thereby modulating the fluid pressure within the main pressure passage 34.

By properly selecting the ratio of $(A_1+A_4)$ to $A_2$ in the design stage of the main regulator valve 28', the gain rate for the un-boosted condition of the main regulator valve 28' may be controlled. This is stated in equation form as Pmain*$(A_1+A_4)$=Pmm*$A_2$+F. It should be appreciated that the sum of $(A_1+A_4)$ is equal to the sum of $(A_2+A_3)$.

As the fluid pressure requirement of the EHC 24 increases, the main pressure regulator 28' will operate in a high gain or boosted condition. The fluid pressure within the main pressure source 32 will increase in response to the higher fluid pressure within the main modulation control source 78. As the fluid pressure within the valley 68 increases, the fluid pressure urges the sleeve 42' against the bias force exerted by the spring 70. When the bias force of the spring 70 is overcome, the sleeve 42' will move to a pressure set position within the bore portion 64. With the sleeve 42' in the pressure set position, the flow of pressurized fluid into the passage 110 from the main pressure source 32 is disallowed. Instead, the sleeve 42' will allow pressurized fluid within the passage 110 to exhaust to the exhaust port 84 via valley 108. By exhausting the passage 110, the pressurized fluid acting on the differential surface area $A_4$ is also exhausted, such that the force urging the valve spool 40 rightward against the bias force of the spring 74 and the force of the pressurized fluid within the main modulation control source 78 acting on the differential surface area $A_2$ is reduced.

By properly selecting the ratio of $A_1$ to $A_2$ in the design stage of the main regulator valve 28', the gain rate in the boosted operating mode may be controlled. This is stated in equation form as Pmain*$A_1$=Pmm* $A_2$+F.

The main pressure regulators 28 and 28' provide two modes of operation, un-boosted and boosted. By providing an un-boosted mode of operation, the low pressure limit for regulation is reduced while improving resolution and system stability. Additionally, by providing a boosted operating mode, the high pressure limit may be increased. In one such transmission, the minimum operating pressure range is as low as 25 pounds per square inch, or psi, while the maximum is as high as 275 psi. This affords an effective regulation range ratio of over 10 to 1 compared to 5 to 1 for other transmissions.

Figure 3:
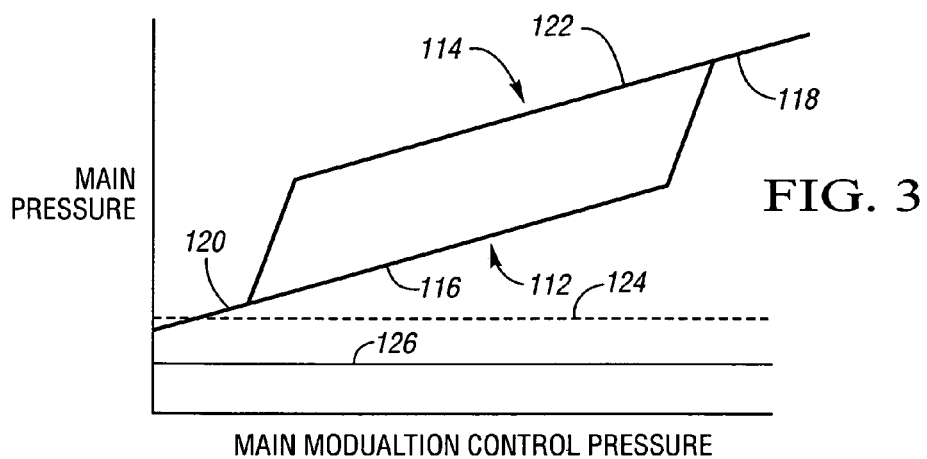
FIG. 3 is a graphical representation of the main pressure as a function of main modulation pressure for the reduced engine load at stop apparatus shown in FIGS. 1 and 2.

FIG. 3 illustrates, in graphical form, the implementation of the main pressure regulators 28 and 28' within the reduced engine load at stop mechanization of the powertrain 10. FIG. 3 can best be described with reference to FIGS. 1 and 2. The curve 112 illustrates the dual gain pressure characteristic of the main regulator valve 28, while the curve 114 illustrates the dual gain characteristic of the main regulator valve 28'. The portion of 116 of the curve 112 represents the pressure gain characteristic of the main pressure regulator 28 in the un-boosted operating condition. Alternately, the portion 118 of the curve 112 represents the gain characteristic of the main pressure regulator 28 in the boosted operating condition. The portion of 120 of the curve 114 represents the pressure gain characteristic of the main pressure regulator 28' in the un-boosted operating condition. Alternately, the portion 122 of the curve 114 represents the gain characteristic of the main pressure regulator 28' in the boosted operating condition.

The line 124 represents the bias force of the return spring assembly 98 of the torque transmitting mechanism 20. As illustrated, the bias force is greater than the force provided by the pressurized fluid acting on the piston 96 at low main pressure values. This condition allows the torque transmitting mechanism 20 to disengage for the portion of the curves 112 and 114 that are below line 124. Line 126 represents the bias force of the remaining torque transmitting mechanisms contained within the EHC 24. As can be readily understood, the bias force of the respective return spring assemblies are insufficient to disengage the remaining torque transmitting mechanisms for the entire range of stable operation of the main pressure regulators, 28 and 28'.

Figure 4:
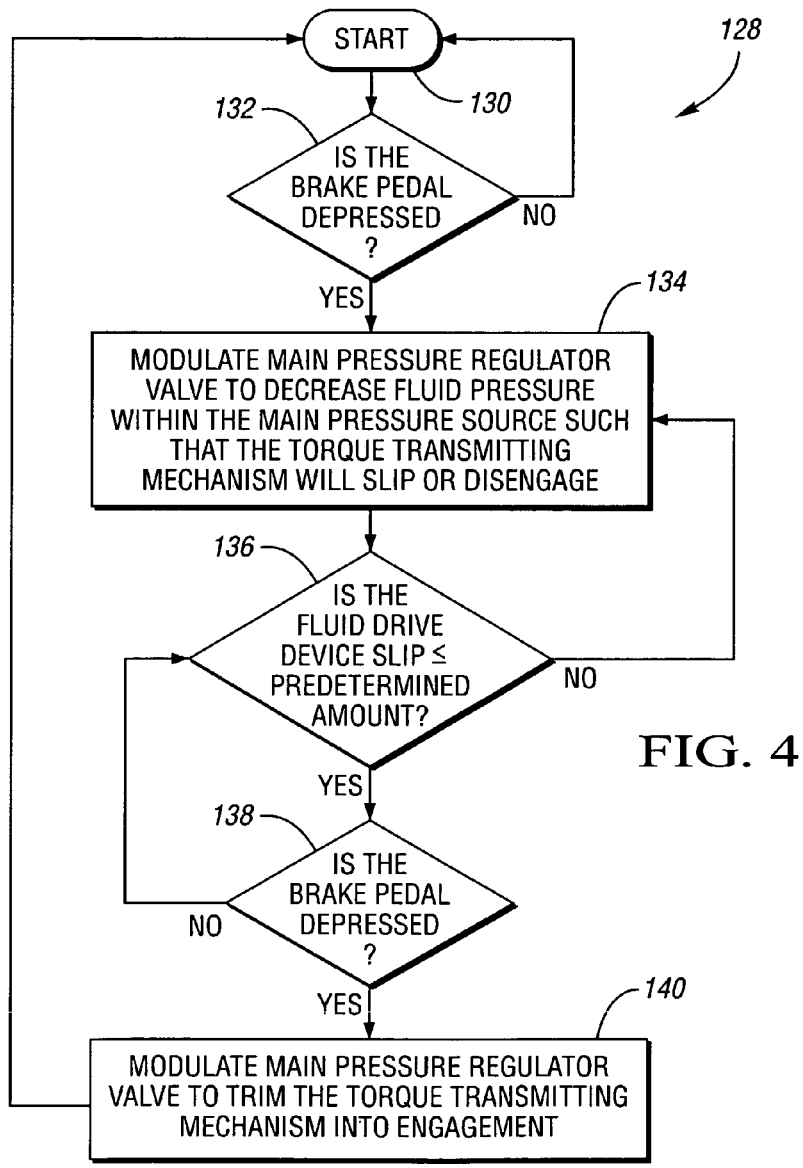
FIG. 4 schematically illustrates, in flow chart format, a method in accordance with the embodiment of the present invention for controlling the partial powertrain employing the reduced engine load at stop apparatus shown in FIG. 1 and 2.

FIG. 4 depicts a method 128 of controlling the transmission 16, shown in FIGS. 1 and 2, to enable reduced engine load at stop. The method 128 can best be described with reference to FIGS. 1 and 2. The method is initiated at step 130.

At step 132, the ECU 36 determines the position of the brake pedal 27. The brake pedal sensor 25 provides the ECU 36 with brake pedal position data to determine if the brake pedal 27 is depressed. If the brake pedal 27 is not depressed, the method 128 loops to step 130 until the ECU 36 determines that the brake pedal 27 has been depressed. At this point, the method 128 will proceed to step 134.

At step 134 the ECU 36 commands the EHC 24 to provide pressurized fluid within the control passage 38 to allow the main modulation control source 78 to modulate the main pressure regulator 28 or 28'. The main pressure regulator 28 or 28' will lower the fluid pressure within the main pressure source 32 such that the torque transmitting mechanism 20 will slip or disengage. By allowing the torque transmitting mechanism 20 to slip or disengage, the efficiency loss due to the slipping of the fluid drive device 14 is reduced. The method 128 then proceeds to step 136.

At step 136, the ECU 36 determines whether the slip within the fluid drive device 14 is less than a predetermined amount. If the slip value of the fluid drive device 14 is greater than the predetermined amount, the method 128 will loop to step 134 and further modulate the main pressure regulator 28 or 28' to further reduce the fluid pressure acting on the piston 96 of the torque transmitting mechanism 20 until the slip within the fluid drive device is reduced to an acceptable level. If the slip value of fluid drive device 14 is less than a predetermined amount, the method 128 will proceed to step 138.

At step 138, the ECU 36 determines the position of the brake pedal 27. The brake pedal sensor 25 provides the ECU 36 with brake pedal position data to determine if the brake pedal 27 is released. If the brake pedal 27 has not been released, the method 128 loops to step 136 until the ECU 36 determines that the brake pedal 27 has been released. At this point, the method 128 will proceed to step 140.

At step 140, the ECU 36 commands the EHC 24 to provided an amount of pressurized fluid within the control passage 38 to allow the main modulation control source 78 to modulate the main pressure regulator 28 or 28'. The main pressure regulator 28 or 28' will trim or increase the fluid pressure within the main pressure source 32 such that the torque transmitting mechanism 20 will engage. The method 128 will then loop to step 130 to begin the method 128 anew.

While the best modes for carrying out the invention have been described in detail, those familiar with the art to which this invention relates will recognize various alternative designs and embodiments for practicing the invention within the scope of the appended claims.

The invention claimed is:

1. A reduced engine load at stop apparatus for a vehicular transmission comprising:
   a selectively engageable torque transmitting mechanism having a piston member operable to effect engagement of said selectively engageable torque transmitting mechanism in response to a fluid pressure;
   a return spring assembly operable to disengage said selectively engageable torque transmitting mechanism when said fluid pressure provided to said selectively engageable torque transmitting mechanism falls below a predetermined value;

a main pressure regulator valve in selective fluid communication with said selectively engageable torque transmitting mechanism, said main pressure regulator valve being operable to reduce said fluid pressure below said predetermined value to effect disengagement of said selectively engageable torque transmitting mechanism in response to a first operator input; and wherein said main pressure regulator valve is operable to increase said fluid pressure communicated to said selectively engageable torque transmitting mechanism above said predetermined value to engage said selectively engageable torque transmitting mechanism in response to a second operator input.

2. The reduced engine load at stop apparatus of claim 1, further comprising a brake pedal, wherein said first operator input is characterized by depressing said brake pedal.

3. The reduced engine load at stop apparatus of claim 1, further comprising a brake pedal, wherein said second operator input is characterized by the release of said brake pedal.

4. The reduced engine load at stop apparatus of claim 1, wherein said main pressure regulator valve includes:
   a valve spool slidably disposed within a stepped bore defined by a valve body;
   a first pressure responsive surface area defined by said valve spool, said first pressure responsive surface area being subject to pressurized fluid from a main pressure source;
   a second pressure responsive surface area defined by said valve spool, said second pressure responsive surface area being subject to pressurized fluid from a main modulation control source;
   a third pressure responsive surface area defined by said valve spool, said third pressure responsive surface area being selectively subject to pressurized fluid from one of said main pressure source and said main modulation control source; and
   a sleeve slidably disposed within said stepped bore, said sleeve being operable to selectively distribute pressurized fluid from said one of said main pressure source and said main modulation control source to said third pressure responsive surface area to effect a change in pressure gain of the main pressure regulator valve.

5. The reduced engine load at stop apparatus of claim 1, wherein said selectively engageable torque transmitting mechanism is operable to enable a low forward range.

6. The reduced engine load at stop apparatus of claim 1, wherein the transmission is characterized by the absence of an auxiliary trim system to selectively engage said selectively engageable torque transmitting mechanism.

7. A method of controlling a vehicle having a transmission and a brake pedal having a brake position sensor operable to determine whether the brake pedal is in a depressed state or a released state, the method comprising:
   providing the transmission with a selectively engageable torque transmitting device within the transmission;
   providing a main pressure regulator valve operable to selectively provide pressurized fluid to selectively engage said selectively engageable torque transmitting mechanism;
   determining if the brake pedal is in the depressed state;
   controlling said main pressure regulator valve to decrease fluid pressure to said selectively engageable torque transmitting mechanism to effect one of disengagement and slip while the brake pedal is in the depressed state;
   determining if the brake pedal is in the released state; and
   controlling said main pressure regulator valve to increase fluid pressure to said selectively engageable torque transmitting mechanism to effect engagement of said selectively engageable torque transmitting mechanism when the brake pedal is in the released state.

8. The method of controlling a vehicle of claim 7, the vehicle further having an engine and a fluid drive device disposed between the engine and the transmission, the method further comprising:
   determining if the fluid drive device is slipping less than or equal to a predetermined amount; and
   controlling said main pressure regulator valve to vary fluid pressure to said selectively engageable torque transmitting mechanism to vary the engagement of said selectively engageable torque transmitting mechanism until the fluid drive device is slipping less than or equal to said predetermined amount.

9. The method of controlling a vehicle of claim 7, wherein said selectively engageable torque transmitting mechanism is operable to enable a low forward range of vehicle operation.

10. The method of controlling a vehicle of claim 7, wherein said main pressure regulator includes:
   a valve spool slidably disposed within a stepped bore defined by a valve body;
   a first pressure responsive surface area defined by said valve spool, said first pressure responsive surface area being subject to pressurized fluid from a main pressure source;
   a second pressure responsive surface area defined by said valve spool, said second pressure responsive surface area being subject to pressurized fluid from a main modulation control source;
   a third pressure responsive surface area defined by said valve spool, said third pressure responsive surface area being selectively subject to pressurized fluid from one of said main pressure source and said main modulation control source; and
   a sleeve slidably disposed within said stepped bore, said sleeve being operable to selectively distribute pressurized fluid from said one of said main pressure source and said main modulation control source to said third pressure responsive surface area to effect a change in pressure gain of the main pressure regulator valve.

11. The method of controlling a vehicle of claim 8, wherein said fluid drive device is one of a fluid coupling and a torque converter.

12. A reduced engine load at stop apparatus for a vehicle comprising:
   a selectively engageable torque transmitting mechanism operable to enable a low forward range of vehicle operation and having a piston member operable to effect engagement of said selectively engageable torque transmitting mechanism in response to a fluid pressure;
   a return spring assembly operable to disengage said selectively engageable torque transmitting mechanism when said fluid pressure provided to said selectively engageable torque transmitting mechanism falls below a predetermined value;
   a main pressure regulator valve in selective fluid communication with said selectively engageable torque transmitting mechanism, said main pressure regulator valve being operable to reduce said fluid pressure below said predetermined value to effect disengagement of said selectively engageable torque transmitting mechanism in response to the depression of a brake pedal; and wherein said main pressure regulator valve is operable to increase said fluid pressure communicated to said selectively engageable torque transmitting mechanism above said predetermined value to engage said selectively engageable torque transmitting mechanism in response to the release of said brake pedal.

13. The reduced engine load at stop apparatus of claim 12, wherein said main pressure regulator valve includes:
- a valve spool slidably disposed within a stepped bore defined by a valve body;
- a first pressure responsive surface area defined on said valve spool, said first pressure responsive surface area being subject to pressurized fluid from a main pressure source;
- a second pressure responsive surface area defined on said valve spool, said second pressure responsive surface area being subject to pressurized fluid from a main modulation control source;
- a third pressure responsive surface area defined on said valve spool, said third pressure responsive surface area being selectively subject to pressurized fluid from one of said main pressure source and said main modulation control source; and
- a sleeve slidably disposed within said stepped bore, said sleeve being operable to selectively distribute pressurized fluid from said one of said main pressure source and said main modulation control source to said third pressure responsive surface area to effect a change in pressure gain of the main pressure regulator valve.

* * * * *